United States Patent [19]

Yamada et al.

[11] Patent Number: 4,849,909

[45] Date of Patent: Jul. 18, 1989

[54] INK-JET RECORDING DEVICE

[75] Inventors: Takahiro Yamada, Ibaraki; Eiji Yoshino; Yasumasa Matsuda, both of Hitachi, all of Japan

[73] Assignees: Hitachi, Ltd.; Hitachi Seiko, Ltd., both of Tokyo, Japan

[21] Appl. No.: 795,773

[22] Filed: Nov. 7, 1985

[30] Foreign Application Priority Data

Nov. 9, 1984 [JP] Japan ................................ 59-235146

[51] Int. Cl.[4] ........................ G01D 15/16; G06F 15/20

[52] U.S. Cl. ................................ 364/519; 101/93.04; 346/75; 364/523; 364/571.01; 400/126

[58] Field of Search ........... 364/523, 519, 523, 571.01; 346/75, 140 R, 75; 101/93.04; 400/126

[56] References Cited

U.S. PATENT DOCUMENTS

| | | | |
|---|---|---|---|
| 3,833,910 | 9/1974 | Chen | 346/75 |
| 3,946,399 | 3/1976 | Zaretsky | 346/75 X |
| 4,032,924 | 6/1977 | Takano et al. | 346/75 |
| 4,050,077 | 9/1977 | Yamada et al. | 346/75 |
| 4,157,551 | 6/1979 | Takano et al. | 346/75 |
| 4,229,749 | 10/1980 | Fillmore | 346/75 |
| 4,292,640 | 9/1981 | Lammers et al. | 346/75 |
| 4,310,845 | 1/1982 | Tsao | 346/75 X |
| 4,364,058 | 12/1984 | Tamai et al. | 346/75 |
| 4,400,705 | 8/1983 | Horike | 346/75 |
| 4,408,211 | 10/1983 | Yamada | 346/75 |
| 4,438,440 | 3/1984 | Jinnai et al. | 346/75 |
| 4,472,722 | 9/1984 | Ebi | 346/75 X |
| 4,491,852 | 1/1985 | Jinnai | 346/75 |
| 4,542,385 | 9/1985 | Jinnai et al. | 346/75 |
| 4,555,710 | 11/1985 | Koike | 346/75 X |
| 4,562,442 | 12/1985 | Jinnai et al. | 346/75 |
| 4,613,871 | 9/1986 | Katerberg | 346/75 |

*Primary Examiner*—Parshotam S. Lall
*Assistant Examiner*—Edward R. Cosimono
*Attorney, Agent, or Firm*—Antonelli, Terry & Wands

[57] ABSTRACT

In an ink-jet recording device in which a nozzle is so excited that ink droplets jetted from the nozzle are alternately separated into large-diameter ink droplets and small-diameter ink droplets, and recording ink droplets to be stuck onto the recording surface are made to fly straight while nonrecording ink droplets are charged and deflected to be retrieved by a gutter, there are provided a nonrecording ink droplet sense circuit and a correction signal generator circuit for generating correction charging voltage when an ink droplet to be controlled is generated provided that the preceding ink droplet is a nonrecording ink droplet and the ink droplet to be controlled is a recording ink droplet.

8 Claims, 9 Drawing Sheets

INK-JET RECORDING DEVICE

BACKGROUND OF THE INVENTION

1. Field of the Invention

The present invention relates to an ink-jet recording device, and in particular to an ink-jet recording device in which ink droplets jetted from the nozzle are alternately separated into large-diameter and small-diameter ink droplets and the small-diameter ink droplets are used to record images with high precision.

2. Description of the Prior Art

In an ink-jet recording device of charge modulating type, ink droplets jetted from the nozzle are charged on the basis of an information signal corresponding to an image to be recorded. The ink droplet thus charged is flown and deflected in a deflecting electric field and is stuck at a predetermined position onto the recording surface to record a dot. In such an ink-jet recording device, it becomes possible to record high precision images by separating ink droplets alternately in large-diameter droplets and small-diameter droplets and recording images by means of small-diameter droplets. Such an ink-jet recording device using small-diameter droplets is disclosed in the specification and drawing of U.S. Pat. No. 4,050,077 invented by Yamada et al.

In a typical ink-jet recording device of charge modulation type according to the prior art, a gutter is disposed in the straight flight path of uncharged ink droplets. The gutter traps and retrieves nonrecording ink droplets. Recording ink droplets are charged and deflected to keep away from the gutter and stick to the recording surface. If recording ink droplets continue one after another in such an ink-jet recording device of charge modulation type, however, the charge of the preceding recording ink droplet repels that of the succeeding recording ink droplet, resulting in flight distortion. Further, the electric field generated by the charge of the preceding recording ink droplet causes the charging distortion of the succeeding recording ink droplet, resulting in recording distortion. In particular, the distortion correction control for small-diameter ink droplets is difficult because of its large deflection sensitivity.

SUMMARY OF THE INVENTION

An object of the present invention is to provide an ink-jet recording device in which ink droplets jetted from the nozzle are alternately separated into large-diameter and small-diameter ink droplets and the small-diameter ink droplets are used to record images with high precision and less recording distortion.

For the purpose of reducing the recording distortion incurred in the above described ink-jet recording device using small-diameter ink droplets, the present inventor tried to reduce the recording distortion due to consecutive recording ink droplets by making the recording ink droplets fly straight to stick them onto the recording surface without electrifying them and by charging and deflecting nonrecording ink droplets for them to be trapped and retrieved by the gutter. Owing to this countermeasure, the recording distortion was reduced when recording ink droplets were consecutive. However, it was found that the recording distortion is large in a recording area composed of only small-diameter ink droplets and hence high quality recording images cannot be obtained. It was also found that the recording image distortion was caused by the charging distortion and the flight distortion due to mutual interference between small-diameter ink droplets having large deflection sensitivities and large-diameter nonrecording ink droplets.

In accordance with the present invention, an ink-jet recording device separating ink jetted from the nozzle alternately into large-diameter droplets and small-diameter droplets and using the small-diameter droplets for recording includes a recording signal generator circuit which supplies a two-valued recording signal to a charging voltage generator circuit. The charging voltage generator circuit produces a charging voltage so as to charge and deflect nonrecording ink droplets to introduce them into a gutter disposed at a position distant from the flying path of ink droplets advancing straight and so as to make recording ink droplets free from a charge and to fly straight toward the recording surface. Thus the recording distortion due to the charge of consecutive recording ink droplets is reduced. Further, a correction signal generating means is provided to supply a correction signal to the charging voltage generator circuit when the ink droplet immediately preceding the ink droplet to be controlled is a nonrecording ink droplet and the ink droplet to be controlled is a recording ink droplet. Upon receiving the correction signal, the charging voltage generator circuit generates correction charging voltage having a polarity opposite to that of the charge possessed by the preceding nonrecording ink droplet. Thus the recording distortion generated on a small-diameter ink droplet by a preceeding nonrecording ink droplet, especially a large-diameter one, is prevented. As a result recording images with high quality and high precision can be obtained.

BRIEF DESCRIPTION OF THE DRAWINGS

Drawings illustrate embodiments of the present invention.

DESCRIPTION OF THE PREFERRED EMBODIMENTS

Figure 3:
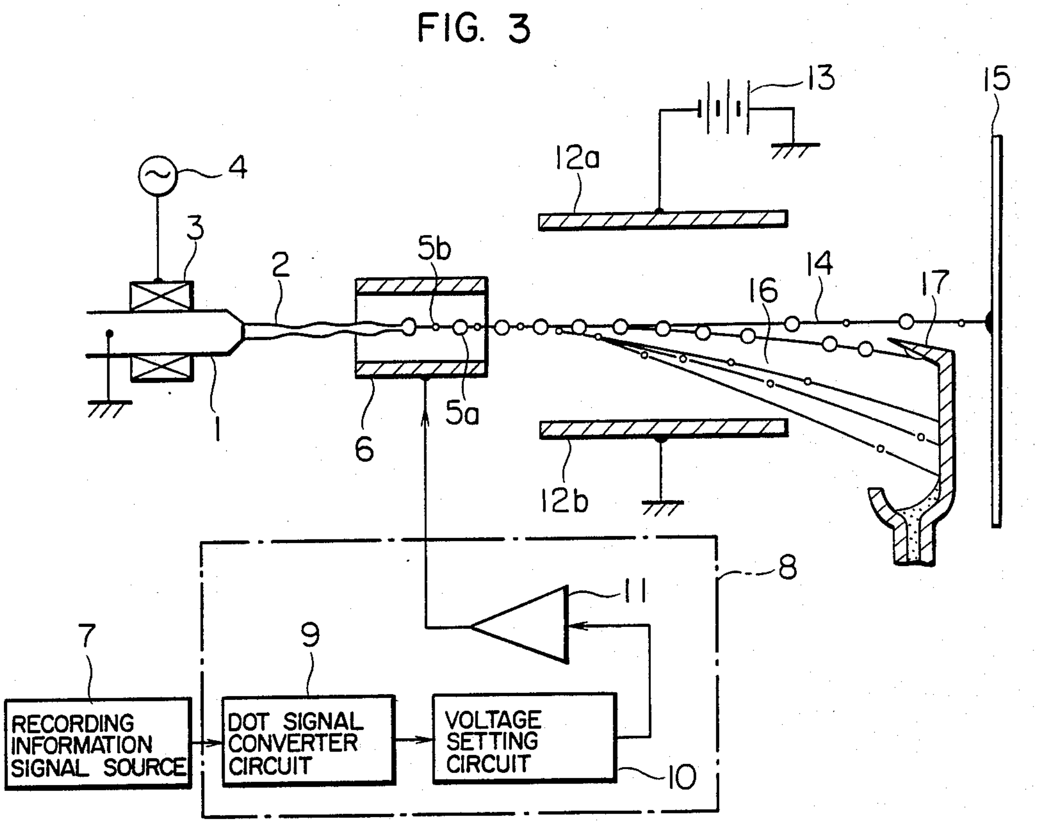
FIG. 3 is a schematic constructional view of an ink-jet recording device which uses large-diameter ink droplets and small-diameter ink droplets for recording.

The entire construction of an ink-jet recording device according to the present invention will now be described by referring to the block diagram of FIG. 3. Ink supplied to a nozzle 1 under pressure is jetted from a nozzle hole as an ink column 2. A piezoelectric element 3 fitted on the nozzle 1 is actuated by a high frequency power source 4 for excitation to provide the ink column with vibration and separate the foremost end of the ink column 2 alternately into a large diameter ink droplet 5*a* and a small diameter ink droplet 5*b*. A charging electrode 6 is so disposed as to surround an area in which the ink column 2 is separated into ink droplets 5*a* and 5*b*. And the charging electrode 6 is actuated by a charging voltage which is produced by a charging control circuit 8 on the basis of a recording information signal supplied from a recording information signal source 7. Thus the charging electrode 6 controls charging of the ink droplets 5*a* and 5*b*. The charging control circuit 8 includes a dot signal converter circuit 9 for converting the recording information signal into a dot signal, a voltage setting circuit 10 for generating the charging voltage on the basis of the dot signal, and an amplifier 11 for amplifying the charging voltage and supplying the amplified charging voltage to the charging electrode 6. Details of the charging control circuit 8 will be described later. The charged ink droplets 5*a* and 5*b* are deflected while they are flying in a deflecting electric field formed by deflecting electrodes 12*a* and 12*b*. The deflecting electrode 12*a* is connected to a negative electrode of a deflecting power source 13 and the deflecting electrode 12*b* is grounded. Therefore, large-diameter ink droplets 5*a* and small-diameter ink droplets 5*b*, which are intended for recording use and are not charged, fly on a straight flying path 14 and stick onto a recoding surface 15 to form dots. Meanwhile, nonrecording ink droplets 5*a* and 5*b* charged with the negative polarity fly on a deflected flying path 16 and are trapped and retrieved by a gutter 17.

Figure 4:
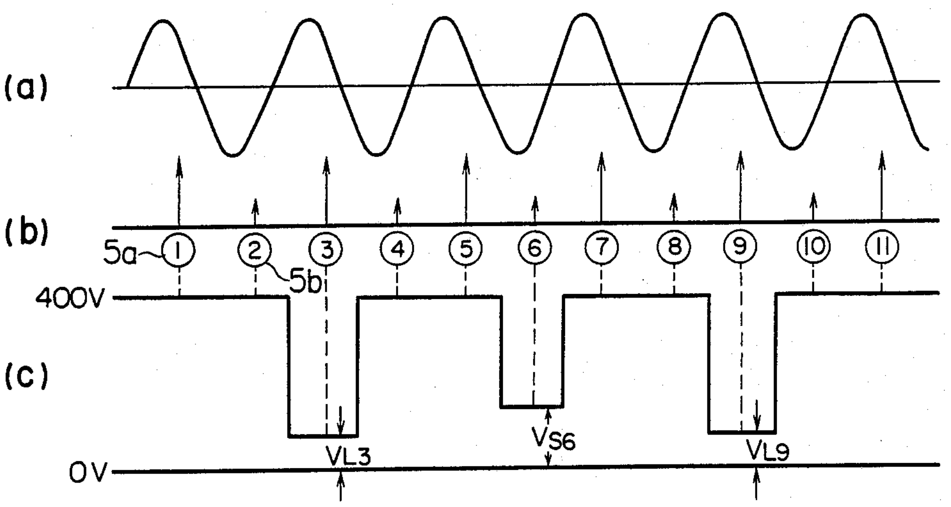
FIG. 4 is an operation time chart of waveforms and timing (a)–(c) of the ink-jet recording device illustrated in FIG. 3.
Figure 5:
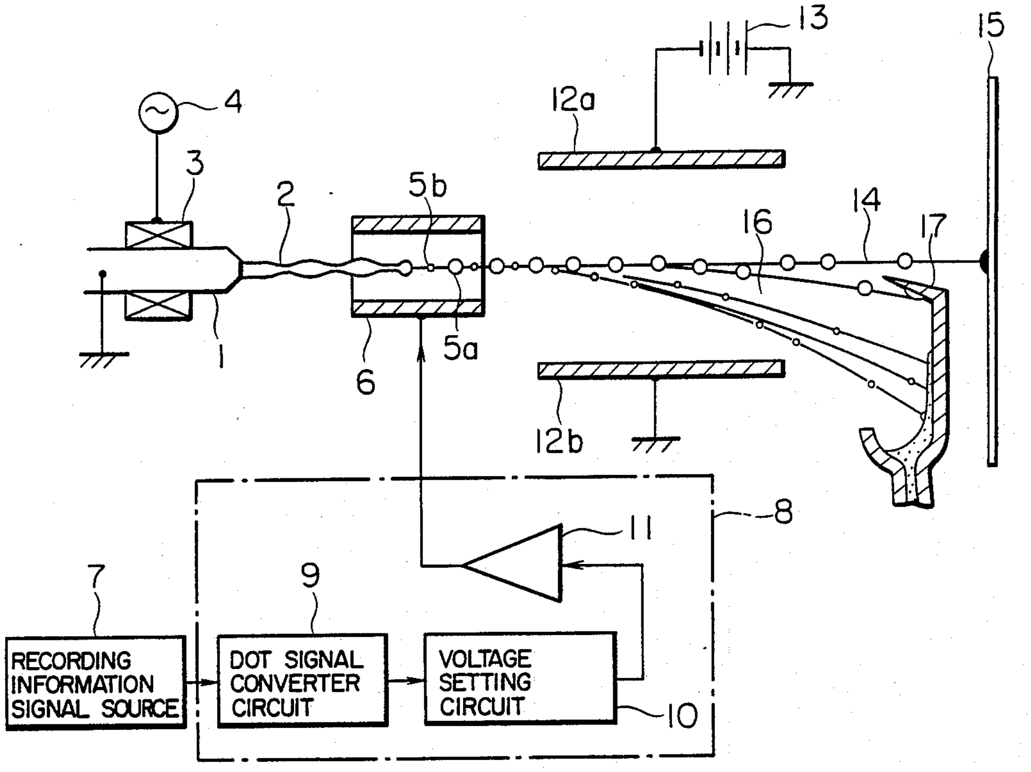
FIG. 5 is a schematic constructional view of an ink-jet recording device which uses only large-diameter ink droplets for recording.
Figure 6:
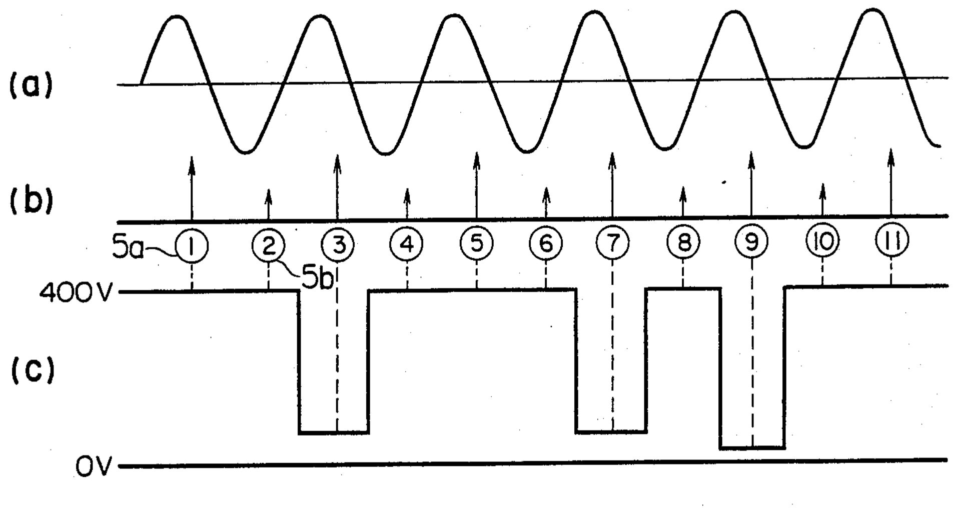
FIG. 6 is an operation time charge of waveforms and timing (a)–(c) of the ink-jet recording device illustrated in FIG. 5.
Figure 7:
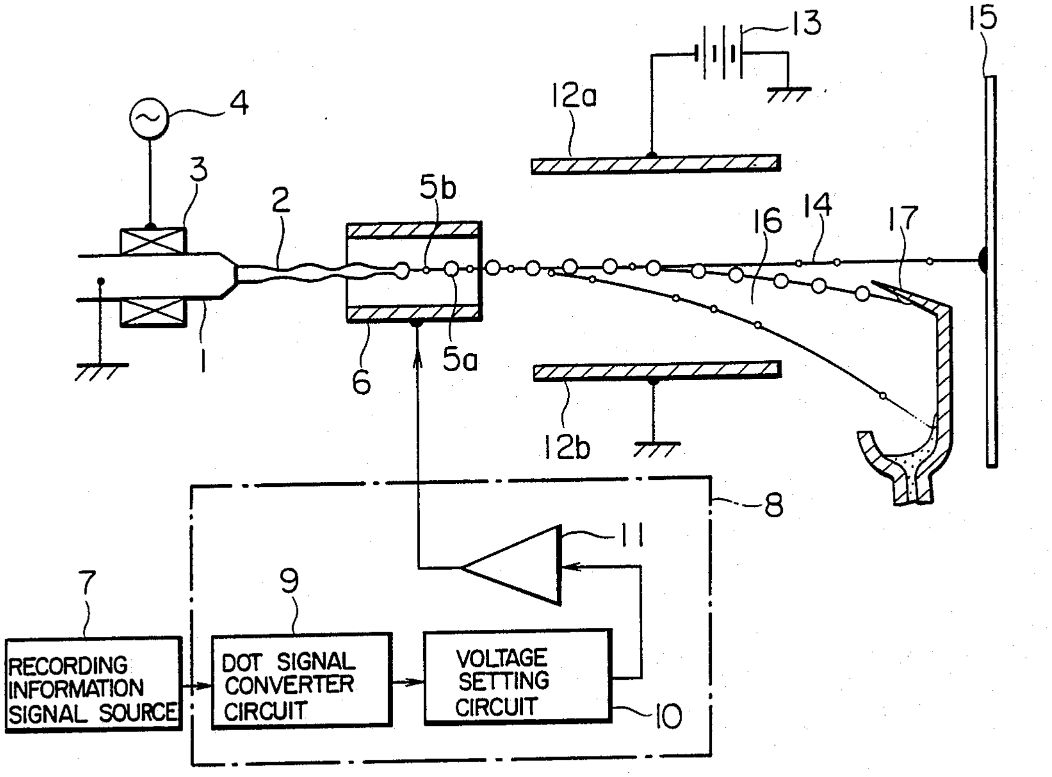
FIG. 7 is a schematic constructional view of an ink-jet recording device which uses only small-diameter ink droplets for recording.
Figure 8:
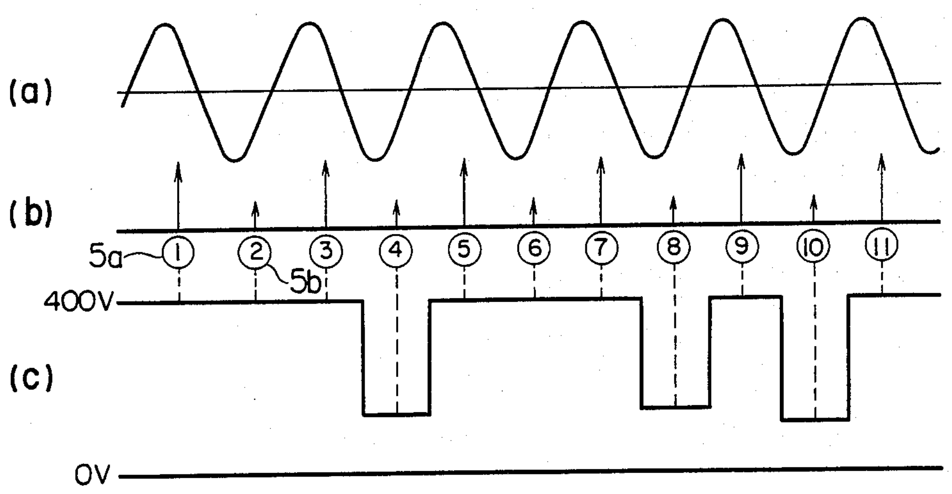
FIG. 8 is an operation time chart of waveforms and timing (a)–(c) of the ink-jet recording device illustrated in FIG. 7.

FIG. 4*a* shows the excitation voltage waveform. FIGS. 4*b* shows the timing at which the ink droplets are generated upon application of the voltage illustrated in FIG. 4*a*. FIG. 4*c* shows the waveform of the charging voltage. The long arrow in FIG. 4*b* represents the generation timing of the large-diameter ink droplets 5*a*. And the short arrow represents the generation timing of the small-diamter ink droplets 5*b*. In order not to charge the recording ink droplets, the charging voltage should be essentially set to zero potential when the recording ink droplets are to be generated. A nonrecording ink droplet which is not charged immediately precedes the above described recording ink droplet in FIG. 4*c*, however, a low correction voltage having a polarity opposing to that of the charge possessed by the nonrecording ink droplet is applied to the charging electrode in order to reduce the charging distortion caused by the above described charge.

Since nonrecording ink droplets ①,②,④,⑤,⑦,⑧, ⑩, and ⑪ are charged by the charging voltage of +400 V, these ink droplets possess negative charges. In order to prevent recording ink droplets 3 , 6 , and 9 from being charged by these negative charges not to advance straight, positive correction voltage $V_{L3}$, $V_{S6}$ and $V_{L9}$ are applied to the charging electrode 6 when the recording ink droplets ③, ⑥, and ⑨ are to be generated. In particular, it is to be noted that comparatively large correction voltage is applied to the charging electrode when the preceding ink droplet is a large-diameter one for recording and the succeeding ink droplet for controlling is a small-diameter one.

Figure 1:
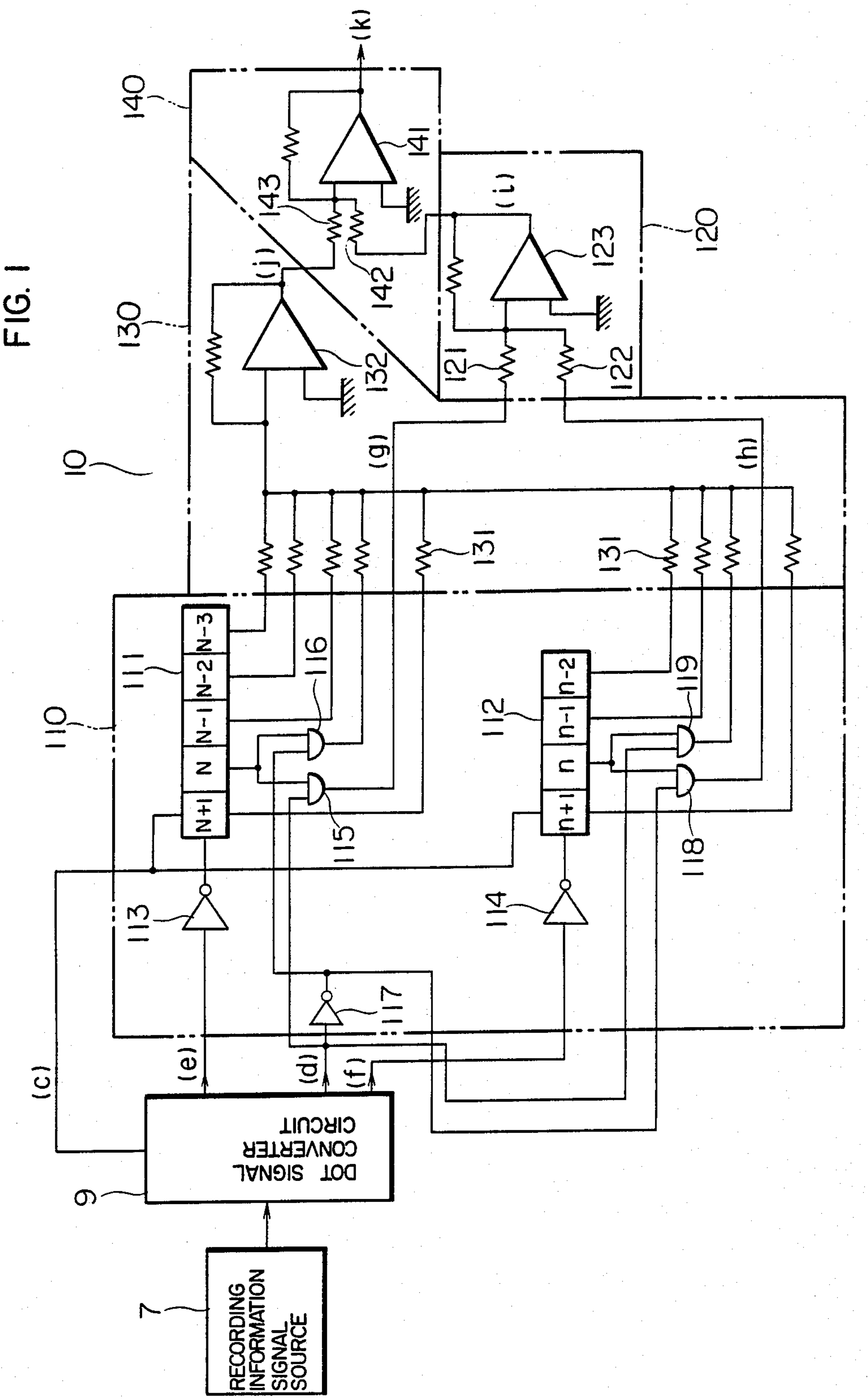
FIG. 1 is a block diagram of a charging control circuit.
Figure 2A:
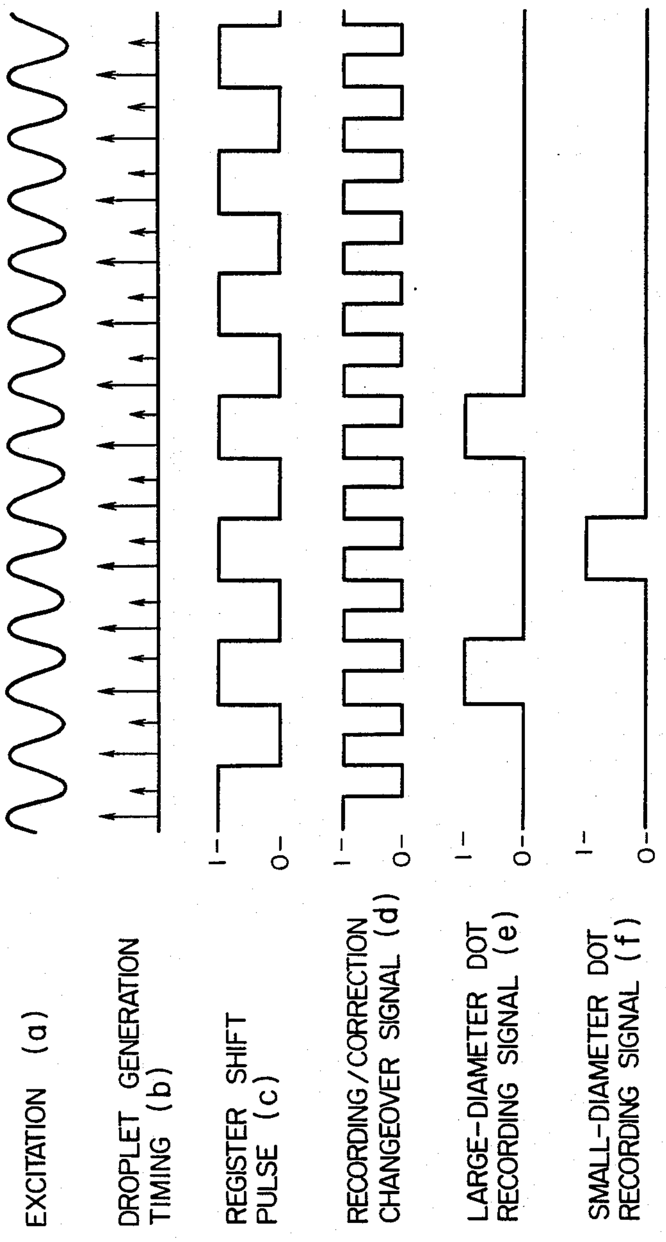
FIGS. 2A and 2B illustrate an operation time chart of waveforms (a)–(k) of the charging control circuit.
Figure 2B:
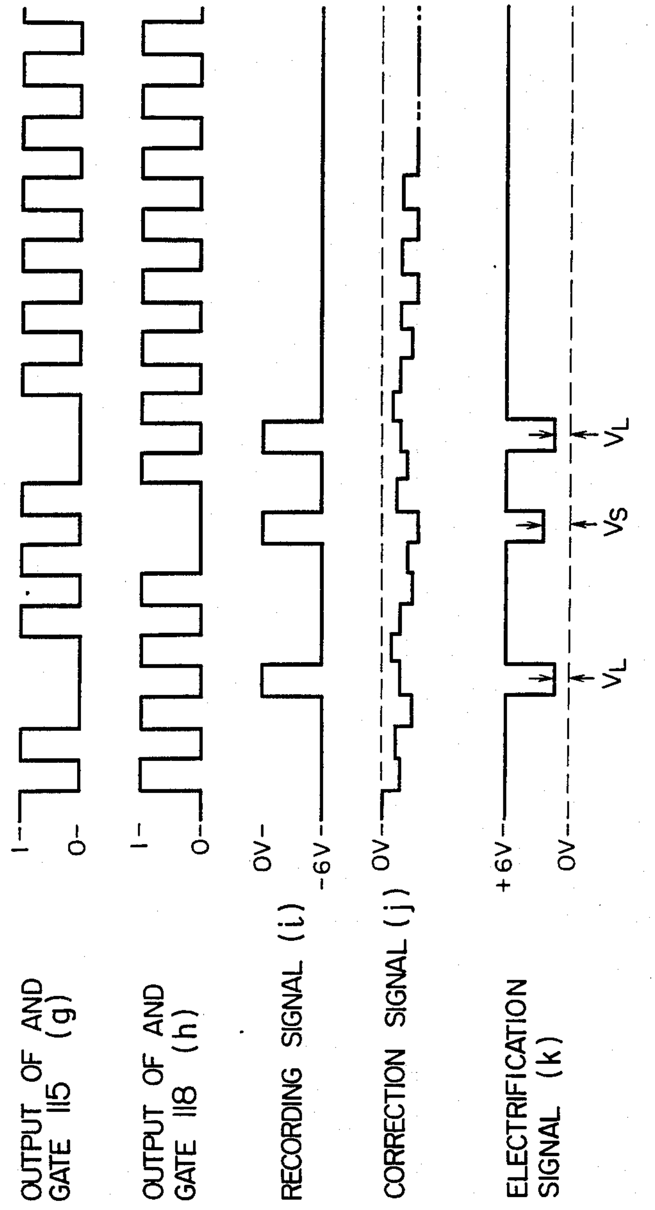

The detailed construction of the charging control 8 and its operation timing chart will now be described by referring to FIGS. 1, 2A and 2B wherein the waveforms of the signals and timing (a)–(k) are illustrated. The detailed construction of the amplifier 11 is not illustrated.

On the basis of the recording information signal supplied from the recording information signal source 7, the dot signal converter circuit 9 sends out a large-diameter dot recording signal (e), a small-diameter dot recording signal (f), a shift pulse (c) for storing the large-diameter dot recording signal and the small-diameter dot recording signal into shift registers 111 and 112 which will be described later, and a recording/correction changeover signal (d). The voltage setting circuit 10 includes a nonrecording ink droplet sense circuit 110, a recording signal generator circuit 120, a correction signal generator circuit 130, and a charging signal generator circuit 140.

In the nonrecording ink droplet sense circuit 110, an inverter 113 inverts the large-diameter dot recording signal (e) and then supplies it to a shift register 111. In synchronism with the shift pulse (c), the shift register 111 successively stores the large-diameter dot recording signal thus inverted. The bit N of the shift register 111 repreents a dot recording signal for the large-diameter ink droplet 5*a* to be controlled. The bit (N−) represents a dot recording signal for the preceding large-diameter ink droplet 5*a*. The bit (N+) represents a dot recording signal for the succeeding large-diameter ink droplet 5*a*. The high level of each of these bits means nonrecording and the low level means recording. An inverter 114 inverts the small-diameter dot recording signal (f) to supply it to the shift register 112. In synchronism with the above described shift pulse (c), the shift register stores the small-diameter dot recording signal thus inverted. The bit n of the shift register 112 represents a dot recording signal for the small-diameter ink droplet 5*b* to be controlled. The bit (n−) represents a dot recording signal for the preceding small-diameter ink droplet 5*b*. The bit (n+) represents a dot recording signal for the succeeding small-diameter ink droplet 5*b*. The high level of each of these bits means nonrecording. The low level of each of these bits means recording. An AND gate 115 is provided with a dot recording signal represented by bit N of the shift register 111 and the recording/correction changeover signal (d). Thus the AND gate 115 sends out a recording information signal (g). An AND gate 116 is provided with the above described dot recording signal represented by the bit N and with a signal obtained by inverting the changeover signal (d) in the inverter 117. Thus the AND gate 116 sends out a correction information signal. An AND gate 118 is provided with the dot recording signal represented by bit n of the shift register 112 and the output signal of the inverter 117. Thus the AND gate 118 sends out a recording information signal (h). An AND gate 119 is provided with the dot recording signal represented by the bit n and the changeover signal (d). Thus the AND gate 119 sends out a correction information signal.

The recording signal generator circuit 120 includes an operational amplifier 123 which is provided with the information signals (g) and (h) respectively through resistors 121 and 122 and which sends out a binary-valued recording signal (i).

The correction signal generator circuit 130 includes an operational amplifier 132. The correction information supplied from two AND gates 116 and 119 and the correction information supplied from the bits N+1 to N−2 of the shift register 111 and the bits n+1 to n−3 of the shift register 112 are supplied to the operational amplifier 132 via an input resistor group 131. The operational amplifier 132 sends out a correction signal (j). The value of each resistor included in the input resistor group 131 is so set as to produce a correction signal component which cancels the effect exerted upon ink droplets of bits N and n by the ink droplet of the bit associated with the resistor.

An operational amplifier 141 included in the charging signal generator circuit 140 is provided with the recording signal (i) from the recording signal generator circuit 120 through an input resistor 142 and is also provided with the correction signal (j) from the correction signal generator circuit 130 through an input resistor 143. The operational amplifier 141 sends out a charging signal (k).

Values of the resistors 121, 122, 131, 142 and 143 are so defined that the charging signal (k) produced by the above described correction may become close to the computation result produced by a charging control circuit using a microcomputer which will be described later.

By using such a charging control circuit 8, it becomes possible to make the recording ink droplets 5a and 5b fly straight without being charged and stick onto the recording surface. As a result, the flight distortion can be prevented. In addition, the nonrecording ink droplet is detected to produce such correction charging voltage as to cancel the charge induced onto the recording ink droplet, which should not be charged, by the charge of the nonrecording ink droplet thus detected. As a result, the recording distortion caused by the charging distortion can also be prevented.

In such an ink-jet recording device, image recording using only large-diameter ink droplets 5a as illustrated in FIG. 5 and FIGS. 6a to 6c can be attained if dot recording signals sent out by the dot signal converter circuit 9 are restricted to the large-diameter dot signal (e).

If the dot recording signals sent out by the dot signal converter circuit 9 are restricted to the small-diameter dot recording signal (f), the device can be used as an ink-jet recording device using only small-diameter droplets 5b as illustrated in FIGS. 7 and 8a to 8c.

Figure 9:
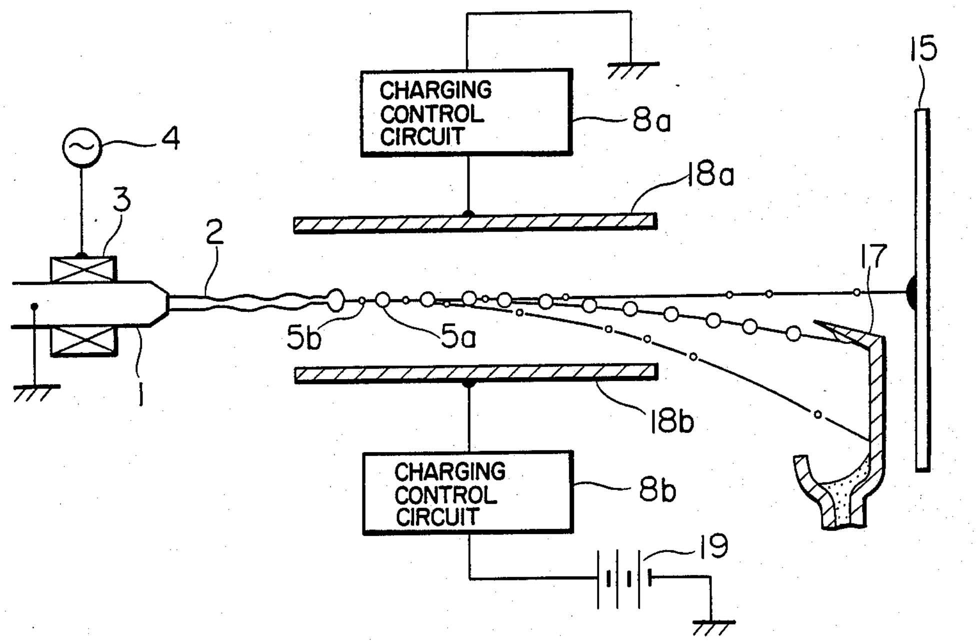
FIG. 9 is a schematic constructional view of an ink-jet recording device having a simplified structure of an electrode section.
Figure 10:
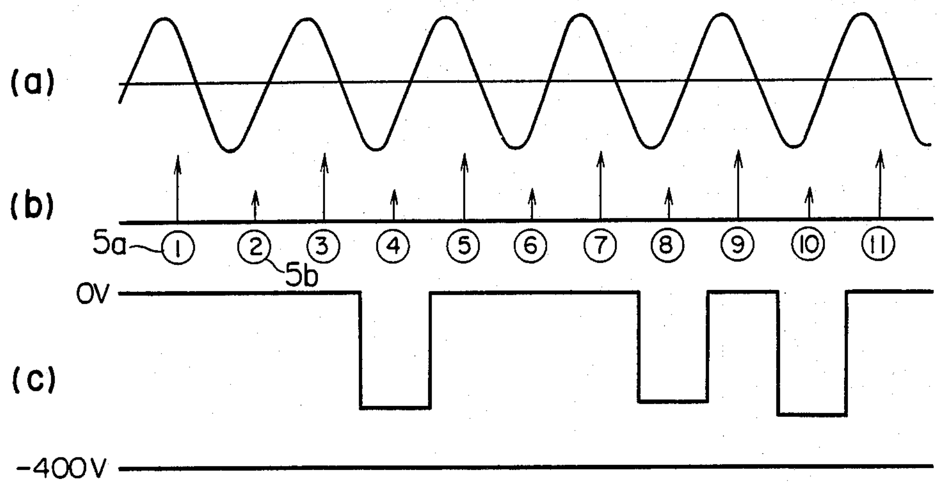
FIG. 10 is an operation time chart of waveforms and timing (a)–(c) of the ink-jet recording device illustrated in FIG. 9.

Further, the present invention can be applied also to an ink-jet recording device having charging mechanism as disclosed in the specification and drawing of U.S. Pat. No. 4,408,211 invented by Yamada. In this case, charging control circuits 8 (8a, 8b) are respectively connected to charging and deflecting electrodes 18a and 18b as illustrated in FIG. 9. And charging and deflecting voltage as illustrated in FIG. 10c is applied to the charging and deflecting electrodes 18a and 18b. In addition, a bias power source 19 is connected to the electrode 18b to superpose bias voltage onto the charging and deflection voltage. Thus the nonrecording ink droplet is charged by the bias voltage to fly in the deflected direction. As a result, the nonrecording ink droplet is trapped and retrieved by the gutter 17. For the recording ink droplet, such correction charging voltage that the ink droplet is not charged is generated to make the ink droplet fly straight and stick onto the recording surface 15.

Further, the position on the recording surface whereto the recording ink droplet heretofore described can be slightly changed by providing the recording ink droplet with a small amount of charge.

Although the charging control circuit 8 heretofore described is composed of a wired logic circuit, circuit configuration including a microcomputer may also be used as occasion demands. An example in this case will now be described by referring to FIGS. 11 to 13.

Figure 11:
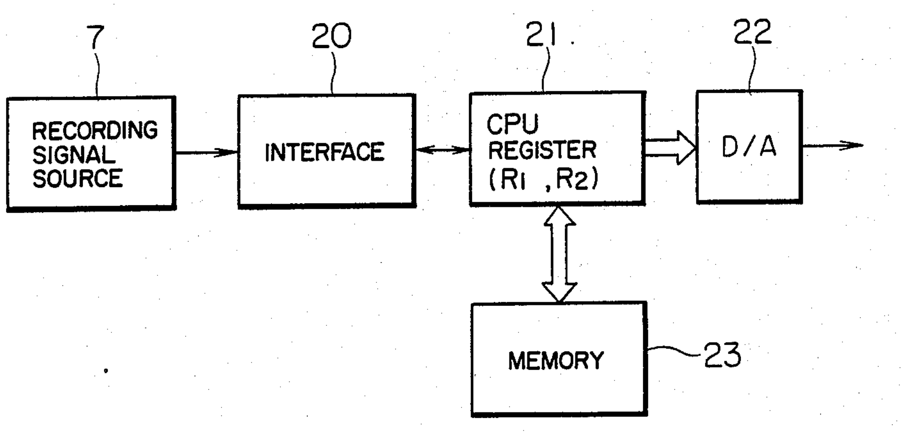
FIG. 11 is a block diagram of an example of a modified charging control circuit using a microcomputer.
Figure 12:
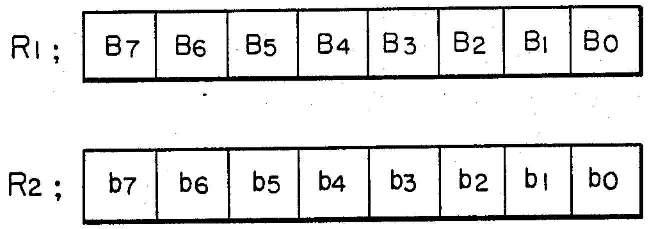
FIG. 12 illustrates charging signal data stored in the registers in FIG. 11.

FIG. 11 shows the hardware construction. The recording information signal source 7 supplies the recording information signal to an arithmetic unit (CPU) 21 via an interface 20. The arithmetic unit 21 develops the recording information signal into dot data to produce charging signal data. The charging signal data are stored in registers $R_1$ and $R_2$ as illustrated in FIG. 12 and are successively supplied to a D/A converter 22 to produce the charging signal. A memory 23 is used for temporary storage of the recording information signal and for the above described data processing effected by the arithmetic unit 21.

Figure 13:
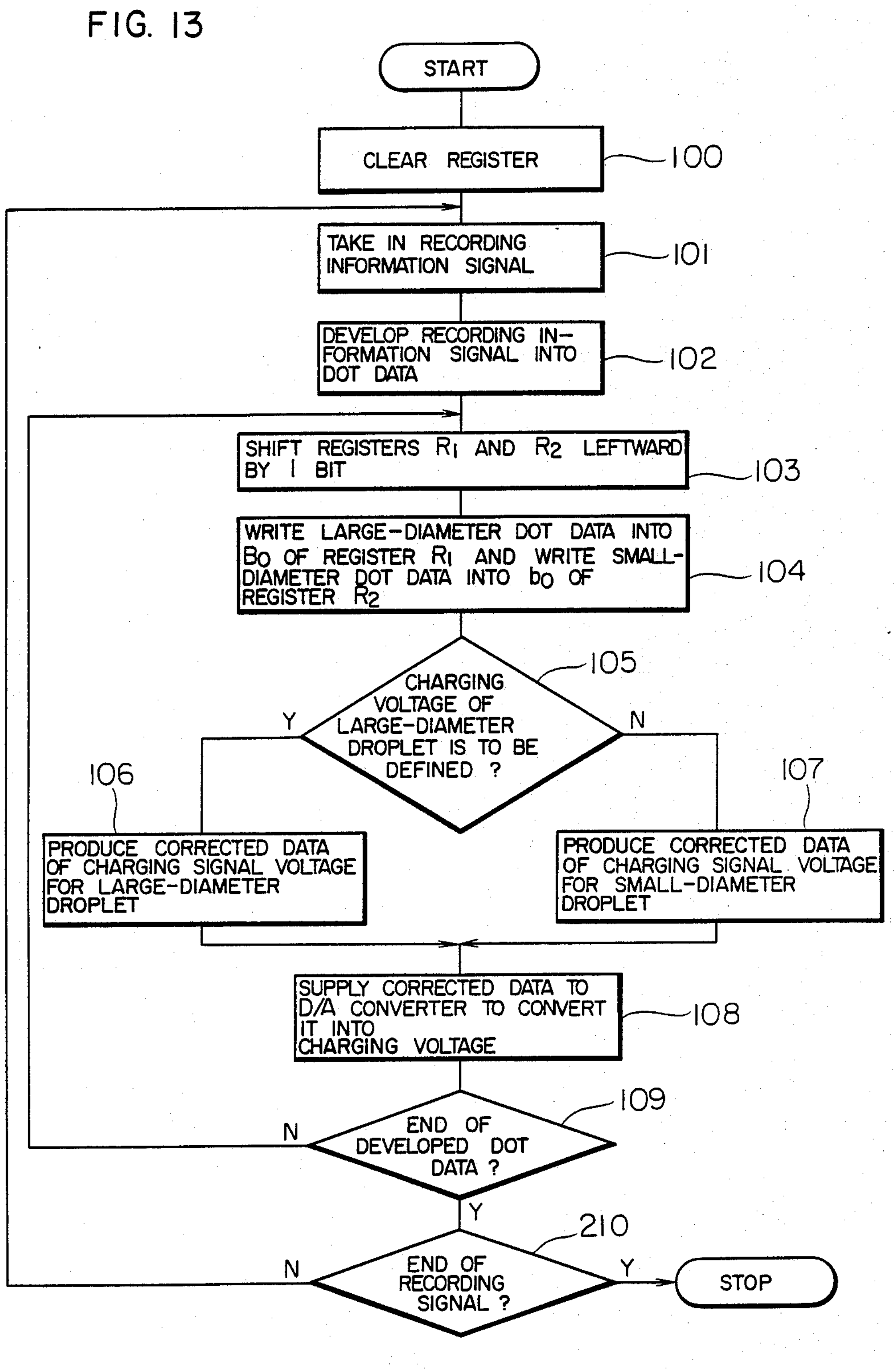
FIG. 13 is a data processing flow chart of the circuit illustrated in FIG. 11.

The data processing function of the arithmetic unit 21 will now be described by referring to a data processing flow chart of FIG. 13. After the registers are cleared in step 100, the recording information signal is taken in step 101. The recording information signal is developed into the dot data in step 102. The data stored in the registers $R_1$ and $R_2$ are shifted leftward by 1 bit in step 103. In step 104, the dot recording data of the large-diameter ink droplet corresponding to one dot are written into $B_0$ of the register $R_1$ and the dot recording data of the small-diameter ink droplet corresponding to one dot are written into $b_0$ of the register $R_2$. Recording data for ink droplets to be succeedingly charge-controlled are stored into $B_0$ of the register $R_1$ and $b_0$ of the register $R_2$. The recording data for ink droplets to be controlled are stored into $B_1$ and $b_1$. The recording data for immediately preceding ink droplets are stored into $B_2$ and $b_2$. The recording data for ink droplets preceding the above described immediately preceding ink droplets are stored into $B_3$ and $b_3$. In the same way, the recording data for further preceding droplets are stored in $B_4$, $b_4$, $B_5$, $b_5$ and so on. The bit "1" represents recording and the bit "0" represents nonrecording.

In step 105, it is determined whether the ink droplet to be controlled is a large-diameter droplet or a small-diameter ink droplet. Control is passed to step 106 for a large-diameter ink droplet and is passed to step 107 for a small-diameter ink droplet. In the step 106, the charging signal data $V_L$ for generating the charging voltage which has already been corrected is derived by referring to the dot recording data stored in the register $R_1$. In the step 107, the charging signal data $V_5$ for generating the charging voltage which has already been corrected is derived by referring to the dot recording data stored in the register $R_2$. This processing may be arithmetic processing. Alternatively, data calculated and stored in the memory 23 beforehand may be searched or utilized. The arithmetic expressions are as follows.

$$V_L = \overline{B}_1 V_1 + \overline{B}_2 v_2 + \overline{B}_3 v_3 + \overline{B}_4 v_4 + \overline{B}_0 v_0 + \overline{b}_1 v_1' \\ \overline{b}_2 v_2' + \overline{b}_3 v_3 + \overline{b}_0 v_0'$$

$$V_s = \overline{b}_1 v_1' + \overline{b}_2 v_2' + \overline{b}_3 v_3' + \overline{b}_4 v_4' + \overline{B}_1 V_1 + \\ \overline{B}_2 v_2 + \overline{B}_3 v_3 + \overline{B}_4 v_4 + \overline{B}_0 v_0$$

where:

$V_L$; charging signal data for the large-diameter ink droplet which has already been corrected in voltage $V_S$; charging signal data for the small-diameter ink droplet which has already been corrected in voltage $V_1$; basic data of the charging signal for the large-diameter ink droplet $V_1'$; basic data of the charging signal for the small-diameter ink droplet $V_0$ to $V_4$; charging correction data for the large-diameteter ink droplet $V_0'$ to $V_3'$; charging correction data for the small-diameter ink droplet.

In step 108, the charging signal data $V_L$ or $V_S$ produced in the step 106 or 107 is supplied to the D/A converter 22 to be converted into a charging signal (charging voltage). In step 109, it is determined whether the processing for converting all developed dot data into the charging signals has been finished. Unless finished, control is returned to the step 103 to repeat the above described processing. If finished, it is determined whether the recording has been finished or not step 210. If the recording has not been finished, control is returned to the step 101 to repeat its succeeding steps. If the recording has been finished, the charging control processing is terminated.

We claim:

1. In an ink-jet recording device for recording an image on a recording surface including;

a nozzle supplied with pressurized ink for jetting said ink from a nozzle hole toward a recording surface, excitation means for exciting said ink jetted from said nozzle and for separating said ink alternately into large-diameter droplets and small-diameter droplets for flying toward said recording surface, charging control means for controlling ink-droplet charging on the basis of a recording information signal, said charging control means including charging electrodes and a charging control circuit, deflection means for applying a deflection electric field to a flying path of an ink droplet in order to deflect a flying direction of the ink droplet on the basis of an amount of charge possessed by said ink droplet, the amount of charge of a small-diameter ink droplet being changed to control the amount of its deflection, the nondeflected ink droplets sticking onto said recording surface to record an image, and a gutter disposed on the flying path of nonrecording ink droplets for trapping the nonrecording ink droplets, said gutter being disposed at a position deviated from the flying path of ink droplets flying straight, and wherein said charging control means comprises:

a charging voltage generator circuit for generating charging voltage to charge said large-diameter ink droplets and said small-diameter ink droplets;

a recording signal generator circuit for supplying a two-valued recording signal to said charging voltage generator circuit to generate the charging voltage, whereby nonrecording ink droplets are charged and deflected to be introduced into said gutter and recording ink droplets are not charged and made to fly straight toward said recording surface; and correction signal generator means including nonrecording ink droplet sense means for sensing whether or not an ink droplet immediately preceding a recording ink droplet to be controlled is a nonrecording ink droplet on the basis of said recording information signal, and correction generating means for generating correction signals having different values in accordance with a diameter of the nonrecording ink droplet immediately preceding the ink droplet to be controlled, said correction generating means being responsive to a sense result of said nonrecording ink droplet sense means for supplying a correction signal to said charging voltge generator circuit to generate a correction charging voltage having a polarity opposite to that of the charge possessed by said preceding nonrecording ink droplet when said ink droplet to be controlled is generated, provided that said ink droplet to be controlled is a recording ink droplet and said ink droplet immediately preceding said ink droplet to be controlled is a nonrecording ink droplet, said charging voltage generator circuit generating the correction charging voltage having a polarity opposite to that of the charged possessed by said preceding nonrecording ink droplet in response to said correction signal when said ink droplet to be controlled is generated.

2. An ink-jet recording device according to claim 1, wherein said nonrecording ink droplet sense means includes register means for storing said recording information signal as dot signals in recording order and for sensing a nonrecording ink droplet immediately preceding the recording ink droplet to be controlled on the basis of a dot signal immediately preceding a dot signal corresponding to said recording ink droplet to be controlled.

3. An ink-jet recording device according to claim 2, wherein said register means includes a first register for storing dot signals for controlling the charge for the large-diameter ink droplets in recording order and a second register for storing dot signals for controlling the charge for the small-diameter ink droplets in recording order.

4. An ink-jet recording device according to claim 1, wherein said correction generating means includes:

means for generating a first correction information signal on the basis of a large-diameter ink droplet immediately preceding said ink droplet to be controlled;

means for generating a second correction information signal on the basis of a small-diameter ink droplet immediately preceding said ink droplet to be controlled and switch means for passing said second correction information signal when said ink droplet to be controlled is a large-diameter ink droplet and for passing said first correction information signal when said ink droplet to be controlled is a small-diameter ink droplet.

5. An ink-jet recording device according to claim 4, wherein said nonrecording ink droplet sense means includes register means for storing said recording information signal as dot signals in recording order and for sensing a nonrecording ink droplet immediately preceding the recording ink droplet to be controlled on the basis of a dot signal immediately preceding a dot signal corresponding to said recording ink droplet to be controlled.

6. An ink-jet recording device according to claim 5, wherein said register means includes a first register for storing dot signals for controlling the charge for the large-diameter ink droplets in recording order and a second register for storing dot signals for controlling the charge for the small-diameter ink droplets in recording order.

7. An ink-jet recording device for recording an image on a recording surface, comprising:

a nozzle supplied with pressurized ink for jetting said ink from a nozzle hole toward a recording surface;

excitation means for exciting said ink jetted from said nozzle and for separating said ink alternately into large-diameter droplets and small-diameter droplets for flying toward said recording surface;

charging control means for controlling ink-droplet charging on the basis of a recording information signal, said charging control means including charging electrodes and a charging control circuit;

deflection means for applying a deflection electric field to a flying path of an ink droplet in order to deflect a flying direction of the ink droplet on the basis of an amount of charge possessed by the ink droplet, the amount of charge of a small-diameter ink droplet being changed to control the amount of its deflection, the nondeflected ink droplets sticking onto said recording surface to record an image; and a gutter disposed on the flying path of nonrecording ink droplets, said gutter being disposed at a position deviated from the flying path of ink droplets flying straight;

wherein said charging control means includes;

a charging voltage generator circuit for generating charging voltage to charge said large-diameter ink droplets and said small-diameter ink droplets, a recording signal generator circuit for supplying a two-valued recording signal to said charging voltage generator circuit to generate the charging voltage, whereby nonrecording ink droplets are charged and deflected to be introduced into said gutter and recording ink droplets are not charged and made to fly straight toward said recording surface, and correction signal generator means including nonrecording ink droplet sense means for sensing whether or not an ink droplet immediately preceding a recording ink droplet to be controlled is a nonrecording ink droplet on the basis of said recording information signal, said nonrecording ink droplet sense means including register means for storing said recording information signal as dot signals in recording order and for sensing a nonrecording ink droplet immediately preceding the recording ink droplet to be controlled on the basis of a dot signal immediately preceding a dot signal corresponding to the recording ink droplet to be controlled, the register means including at least one register for storing dot signals for controlling the charge for the large-diameter ink droplets in recording order, and correction generating means for generating correction signals having different values in accordance with a diameter of the nonrecording ink droplet immediately preceding the ink droplet to be controlled, said correction generating means being responsive to a sensed result of said nonrecording ink droplet sense means for supplying a correction signal to said charging voltage generator circuit to generate a correction charging voltage having a polarity opposite to that of the charge possessed by said preceding nonrecording ink droplet when the ink droplet to be controlled is generated, provided that the ink droplet to be controlled is a recording ink droplet and the ink droplet immediately preceding the ink droplet to be controlled is a nonrecording ink droplet, said charging voltage generator circuit generating the correction charging voltage having a polarity opposite to that of the charge possessed by said preceding and recording ink droplet in response to the correction signal when the ink droplet to be controlled is generated.

8. An ink-jet recording device according to claim 7, wherein said correction generating means includes:

means for generating a first correction information signal on the basis of a large-diameter ink droplet immediately preceding the ink droplet to be controlled;

means for generating a second correction information signal on the basis of a small-diameter ink droplet immediately preceding the ink droplet to be controlled; and switch means for passing the second correction information signal when the ink droplet to be controlled is a large-diameter ink droplet and for passing the first correction information signal when the ink droplet to be controlled is a small-diameter ink droplet.

* * * * *